US012720332B2

(12) United States Patent
Mirza

(10) Patent No.: US 12,720,332 B2
(45) Date of Patent: Aug. 25, 2026

(54) UPLINK TRANSMISSION LAYER MANAGEMENT

(71) Applicant: T-Mobile Innovations LLC, Overland Park, KS (US)

(72) Inventor: Mochamad Mirza, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 312 days.

(21) Appl. No.: 18/540,261

(22) Filed: Dec. 14, 2023

(65) Prior Publication Data

US 2025/0203395 A1 Jun. 19, 2025

(51) Int. Cl.

| | |
|---|---|
| ***H04W 24/02*** | (2009.01) |
| ***H04B 17/318*** | (2015.01) |
| ***H04L 5/14*** | (2006.01) |
| ***H04W 64/00*** | (2009.01) |

(52) U.S. Cl.

CPC .......... *H04W 24/02* (2013.01); *H04B 17/328* (2023.05); *H04L 5/14* (2013.01); *H04W 64/003* (2013.01)

(58) Field of Classification Search

CPC .. H04W 24/02; H04W 64/003; H04B 17/328; H04L 5/14

USPC .......................................................... 370/329

See application file for complete search history.

(56) References Cited

U.S. PATENT DOCUMENTS

| | | | | |
|---|---|---|---|---|
| 2009/0086855 A1* | 4/2009 | Jin | H04L 1/20 | 375/341 |
| 2010/0142441 A1* | 6/2010 | Toda | H04J 99/00 | 370/328 |
| 2011/0064043 A1* | 3/2011 | Balachandran | H04L 5/006 | 370/330 |
| 2012/0014349 A1* | 1/2012 | Chung | H04W 72/0453 | 370/329 |
| 2012/0134440 A1* | 5/2012 | Yun | H04L 27/2613 | 375/295 |
| 2013/0242813 A1 | 9/2013 | Wang et al. | | |
| 2014/0233525 A1* | 8/2014 | Kim | H04L 5/0051 | 370/329 |
| 2016/0037550 A1* | 2/2016 | Barabell | H04W 72/046 | 455/450 |
| 2019/0319751 A1 | 10/2019 | Chen et al. | | |

* cited by examiner

*Primary Examiner* — Nicholas A Jensen
*Assistant Examiner* — Oladiran Gideon Olaleye
(74) *Attorney, Agent, or Firm* — Jones Burke, PLLC

(57) ABSTRACT

A method for uplink layer selection includes determining a location of a multi-antenna wireless device and identifying a zone for the multi-antenna wireless device based on the location. The method further includes selecting an uplink transmission mode for each of the multiple antennas based on the identified zone. In a zone closest to a serving access node, the multiple antennas utilize carrier aggregation and in a zone furthest from the serving access node, the multiple antennas utilize transmit diversity.

20 Claims, 9 Drawing Sheets

UPLINK TRANSMISSION LAYER MANAGEMENT

TECHNICAL BACKGROUND

A wireless network, such as a cellular network, can include an access node (e.g., base station) serving multiple wireless devices or user equipment (UE) in a geographical area covered by a radio frequency (RF) transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), 5G RATs (new radio (NR)), and 6G RATs. As access nodes have evolved, networks may include a combination of multiple access node such as 4G LTE evolved NodeBs (eNodeBs or eNBs) and 5G NR next generation NodeBs (gNodeBs or gNBs) or alternatively may be exclusively 4G or 5G cellular systems. 5G RATs may be utilized with a standalone (SA) core having a service based architecture (SBA) or with an evolved packet core (EPC) utilizing a non-standalone (NSA) architecture.

Further, in an effort to boost coverage and enhance throughput in wireless networks, technologies such as multiple-input multiple-output (MIMO) have been developed. MIMO can be used in an uplink environment simultaneously with single input single output (SISO). With the evolution of 5G, millimeter Wave (mmWave), and sub-6G, increasing numbers of antennae can be used to form beams or perform MIMO operating modes, including single-user (SU-MIMO) and/or a multi-user (MU-MIMO) mode. SU-MIMO is the ability to transmit one or multiple data streams, also called layers, from one transmitting array to a single user. SU-MIMO can thereby increase the throughput for that user and increase the capacity of the network.

There can be issues related to uplink performance, caused by various factors including a type of transmission being used, a distance of a wireless device from a serving access node (such as an eNodeB, gNodeB, etc.), frequencies being used for uplink transmission, and so on. Additionally, wireless devices have evolved with multiple transmission (Tx) antennas that provide the capability to utilize multiple different layer configurations for uplink transmissions. Accordingly, a solution is needed for uplink transmission layer management in order to optimize network and wireless device performance.

OVERVIEW

Exemplary embodiments described herein include systems, methods, processing nodes, non-transitory computer readable mediums, and wireless devices for optimizing wireless device throughput and network performance in the uplink for multi-antenna wireless devices, for example, for wireless devices having three transmission (Tx) antennas. Thus, instead of one or two Tx antennas, customer premises equipment (CPEs) have evolved that can include three or more Tx antennas.

An exemplary method includes receiving data from the multi-antenna wireless devices within a cell provided by an access node and determining a location of the multi-antenna wireless device based on the received data. The method additionally includes identifying a zone for the multi-antenna wireless device based on the location and selecting an uplink transmission mode for each of the multiple antennas of the multi-antenna wireless device based on the identified zone.

In further embodiments provided herein, the method includes selecting the uplink transmission mode to optimize uplink throughput for the multi-antenna wireless device. This may be accomplished by defining multiple zones within a cell based on a serving distance from an access node and defining an uplink transmission mode for each antenna based on the zone of the multi-antenna wireless device. In embodiments provided herein, four zones may be defined. The various uplink transmission modes may differ by zone and may include, for example, two component carrier aggregation (CA) with two layer SU-MIMO on TDD component carriers, three component CA on two TDD component carriers and one FDD component carrier, single layer transmit diversity on a single component carrier, or single layer SISO on a component carrier.

In further embodiments, a system is provided including communication circuitry enabling communication with a multi-antenna wireless device and at least one processor performing multiple operations. The multiple operations include determining a location of the multi-antenna wireless device based on communications received from the multi-antenna wireless device at the communication circuitry. The operations further include identifying a zone for the multi-antenna wireless device based on the location and selecting an uplink transmission mode for each of the multiple antennas of the multi-antenna wireless device based on the identified zone.

An exemplary wireless device includes three transmission antennas and at least one receiving antenna. The exemplary wireless device additionally includes a processor executing instructions to perform multiple operations. The operations include reporting information enabling identification of a location of the wireless device and receiving an instruction to execute uplink transmissions based on one of four zones correlated with the wireless device location. The operations further include performing an uplink transmission mode for each of the three transmission antennas of the wireless device based on the received instruction.

In yet further embodiments, non-transitory computer readable mediums and/or processing nodes are provided for performing the above-described exemplary method. The non-transitory computer-readable medium or processing node stores instructions executed by a processor to perform the multiple operations. Thus, embodiments described herein selectively assign uplink transmission modes including transmission layers based on wireless device location and a number of transmission antennas of the wireless device. Based on the number of transmission antennas and location of a wireless device, embodiments provided herein further adjust a number of transmission layers utilized for uplink transmissions from the wireless device.

DETAILED DESCRIPTION

Figure 1:
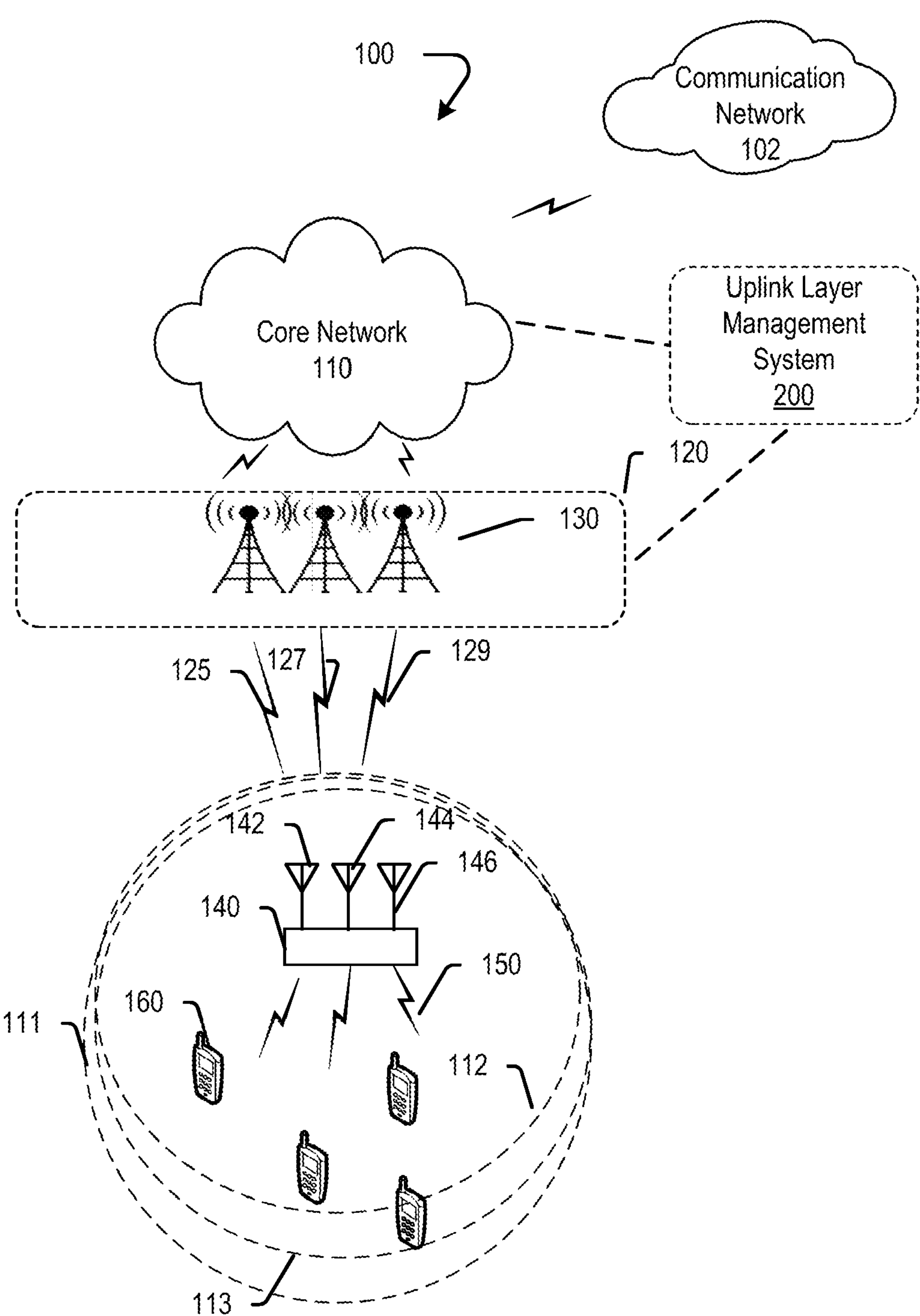
FIG. 1 depicts an exemplary operating environment in accordance with the disclosed embodiments.

Exemplary embodiments described herein include systems, methods, processing nodes, computer readable mediums, and wireless devices for optimizing uplink throughput by implementing uplink layer management for multi-antenna wireless devices. Layer management may be performed based on pre-defined zones, a number of transmission antennas, and a location of the wireless device.

In most cases, uplink transmission capabilities are inferior to downlink transmission capabilities, as wireless devices do not have uplink transmit power that is as strong as the downlink transmit power from the access node. Accordingly, uplink layer management can be utilized to optimize uplink transmission both in areas close to the access nodes and at distances further from the access node, at which wireless devices have trouble reaching the access node. At these further distances, wireless devices are often either subject to a handover or loss of coverage and thus, layer management can be utilized to delay or prevent these situations which result in interruptions.

In exemplary environments, different carriers may be present that utilize different spectrum usage techniques. For example, frequency division duplexing (FDD) and time division duplexing (TDD), are two different spectrum usage techniques employed in wireless networks. While FDD uses separate frequencies for the uplink and the downlink, TDD uses a single frequency for both uplink and downlink, and therefore, causes uplink and downlink data to be transmitted at different times. In embodiments provided herein, TDD uplink streams may only be transmitted 20-30% of the time, with downlink streams occupying the remaining transmission time.

Each carrier, whether FDD or TDD, is associated with a frequency layer and has specific characteristics in terms of coverage and capacity (bandwidth, data rates, throughput). Using carrier aggregation, the capabilities of the carriers can be combined to enhance the end user experience. Carriers in the higher frequency ranges of TDD typically provide greater capacity, while carriers in the lower range of FDD provide wider or deeper coverage as the lower frequencies allow for larger wavelengths that propagate further. Thus, carrier aggregation can be implemented to get the best performance out of the available spectrum assets.

In general, FDD is considered better for coverage, while TDD is better for capacity. Accordingly, embodiments provided herein can utilize FDD/TDD carrier aggregation in certain areas by combining a high-band TDD spectrum with low-band FDD spectrum. Further, multiple carriers utilizing different TDD bands may be aggregated. The frequency band of each carrier is a limiting factor in terms of how much data can be transferred. The wider the frequency band, the more data that can be transferred. Thus, utilizing carrier aggregation increases band size and also data rate per user.

The more uplink transmission antennas a wireless device has, the more carriers that are available to be aggregated. In embodiments provided herein, uplink transmission layer management allows either two or three carriers to be aggregated for a wireless device having three uplink transmission antennas. Furthermore, when two carriers are aggregated, one carrier may utilize multi-layer uplink transmission using SU-MIMO and the other may utilize one layer SISO. These techniques are particularly useful in zones closest to the access node in order to enable higher throughput.

Additionally, given a wireless device with multiple uplink transmission antennas, in areas further from an access node, transmit diversity can be utilized to combine multiple antennas to create a high power UE (HPUE) so that the wireless device can transmit data further in the uplink. In areas furthest from the access node, the power of three antennas can be combined to transmit to the access node from the wireless device. In embodiments provided herein, the power of the three antennas is combined using an FDD carrier due to the larger coverage area of the FDD carrier. Using this technique, even wireless devices in areas furthest from the access node are able to communicate on the uplink.

Thus, embodiments disclosed herein utilize different modes that incorporate uplink two CC and three CC carrier aggregation. Further, embodiments disclosed herein utilize two transmission antennas with the same component carrier with two different data streams to create two layers and double throughput using MIMO for wireless devices close to a base station. Further away from the base station, where uplink SINR lowers, embodiments provided herein can combine transmitters with transmit diversity to create high power user equipment (HPUEs). Between MIMO, carrier aggregation, and HPUEs, embodiments provided herein optimize uplink transmissions.

Embodiments provided herein may operate within an environment having three component carriers including two TDD carriers and one FDD carrier and a wireless device having three uplink transmission antennas. Within this environment, logic provides a determination of uplink transmission modes, e.g., when to combine two transmitters, when to perform carrier aggregation, and when to use MIMO in order to achieve uplink optimization for the wireless device user.

In embodiments set for herein, optimization is achieved for a wireless device having three Tx antennas by dividing a coverage area into four zones based on the distance from the serving access node. In zone one, or a near zone, the wireless device is configured with two component carrier aggregation by utilizing two layer MIMO on TDD and one layer SISO on FDD. In zone two, which is a mid-cell zone adjacent to zone one, the wireless device is configured to utilize one layer SISO on two different TDD bands and one layer on FDD, thus creating three component carrier (CC) carrier aggregation. In zone three, which is a TDD coverage extension area adjacent to zone two, the wireless device is configured to utilize transmit diversity on a TDD carrier to create an HPUE and utilize one layer SISO on FDD, thus utilizing two CC carrier aggregation. Finally, in zone four, which is a cell edge zone, the wireless device is configured to perform an inter-frequency handover from TDD as the primary cell (PCell) to FDD. This configurations creates an HPUE through transmit diversity, but does not utilize carrier aggregation. Thus, the wireless device transmits on one layer FDD with transmit diversity.

Through the use of the above described techniques, a significant increase in uplink throughput can be created without a major network infrastructure upgrade. A further benefit is the extension of uplink transmission reach though the use of transmit diversity at the cell edge. Through embodiments disclosed herein, the layer management strategy maximizes uplink performance and reduces inefficiency.

In embodiments disclosed herein, a cell or wireless network may be provided by an access node. The access node may utilize one or more antennas to communicate with wireless devices or user equipment (UEs), such as for example, wireless phones, Internet of Things (IoT) devices, and wireless gateway devices. An exemplary environment described herein includes a layer management system, at least an access node (or base station), such as an eNodeB, or gNodeB, as well as one or more end-user wireless devices.

In addition to the systems and methods described herein, the operations for layer management may be implemented as computer-readable instructions implemented by an access node or other network nodes such as processing nodes. The processing node may include a processor included in the access node or a processor included in any controller node in the wireless network that is coupled to the access node.

FIG. 1 depicts an exemplary operating environment 100. A core network 110 is coupled to a radio access network (RAN) 120 including access nodes 130. The core network 110 and RAN 120 serve wireless devices 140 and 160 over communication links 125, 127, and 129. The wireless devices 140 may include, for example, customer premises equipment (CPEs) and the wireless devices 160 can include end-user wireless devices (e.g., UEs). The communication links 125, 127, and 129 can use 5G NR, 4G LTE, 6G, or any other suitable type of radio access technology (RAT). Further, the communication links 125, 127, 129 can be TDD or FDD communication links and may include uplink and downlink communication links. Core network 110 can be structured as an evolved packet core (EPC) network or as a 5G core using a service-based architecture (SBA) utilizing core network functions and elements, including, for example, user plane functions (UPF) control plane functions (CPF). The core network 110 provides access to a communication network 102, such as the Internet or other packet data network.

The RAN 120 can include various access network functions and devices disposed between the core network 110 and the wireless devices 140 and 160. For example, the RAN 120 includes access nodes or base stations 130. The access nodes or base stations 130 may be or include eNodeBs and/or gNodeBs communicating with the plurality of wireless devices 140, 160. The access nodes 130 may operate within coverage areas 111, 112, and 113 by deploying the links 125, 127, and 129 respectively. The wireless links 125, 127, 129 may correspond to the same or different RATs, frequency bands, or bandwidths. Coverage areas 111, 112, 113 are shown as having a defined boundary and signal parameters may vary between the access nodes 130 and the boundaries of the coverage areas 111, 112, and 113. Specifically, signal parameters generally deteriorate as devices progress towards the boundary of the coverage areas 111, 112, and 113. More power is required to transmit signals from wireless devices 140, 160 closer to the boundaries of the coverage areas 111, 112, and 113 than from wireless devices closer to the access nodes 130. Further, the smaller coverage areas 112, 113 may represent coverage areas of TDD component carriers and the larger coverage area 111 may represent a coverage area of an FDD component carrier.

It is understood that the disclosed technology may also be applied to communication between an end-user wireless device and other network resources, depending on the RAT and network technology being implemented. Further, either of core network 110 and RAN 120 can include one or more of a local area network, a wide area network, and an internetwork (including the Internet) capable of communicating signals and carrying data, for example, to support voice, push-to-talk, broadcast video, and data communications by wireless devices 140, 160. Alternatively or additionally to the UPF and CPF, the illustrated network topology can include packet gateways, such as a CUPS based user plane S-GW, P-GW, or SAE-GW.

The core network 110 may incorporate many functions not shown in FIG. 1. For example, the CPF may include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The UPF may also include, for example, a Unified Data Repository (UDR).

Communication network 102 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 102 can be capable of carrying data, for example, to support voice, push-to-talk, broadcast video, and data communications by wireless devices 140, 160. Wireless network protocols can comprise Multimedia Broadcast Multicast Services (MBMS), code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE), or 6G. Wired network protocols that may be utilized by communication network 102 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 102 can also comprise additional base stations, controller nodes, telephony switches, internet routers, network gateways, computer systems, communication links, or some other type of communication equipment, and combinations thereof.

The exemplary operating environment 100 may further include uplink layer management system 200, which is illustrated as operating between the core network 110 and the RAN 120. However, it should be noted that the uplink layer management system 200 may operate in the core 110, in the RAN 120, or may be distributed. For example, the uplink layer management system 200 may utilize components located at both the core network 110 and at the multiple access nodes 130. Alternatively, the uplink layer management system 200 may be an entirely discrete system operating in conjunction with the RAN 170, core 110 and/or the wireless devices 140, 160.

The uplink layer management system 200 receives information pertaining to wireless device locations from wireless devices 140, 160. For example, the uplink layer management system 200 may collect performance parameters such as reference signal received power (RSRP), reference signal received quality (RSRQ), signal to noise and interference ratio (SINR), and power headroom (PHR). Further, location information, such as GPS coordinates may additionally or alternatively be transmitted. In embodiments set forth herein, the wireless devices 140, 160 may send these parameters to the access nodes 130, which convey the parameters to the uplink layer management system 200. The uplink layer management system 200 analyzes this information in order to determine a device location and corresponding zone, which will be further described herein.

In embodiments provided herein, the uplink layer management system 200 optimizes uplink performance for fixed wireless devices 140, such as CPEs having three transmission antennas. The uplink layer management system 200 may evaluate the use of two CC and three CC carrier aggregation. The uplink layer management system 200 may further evaluate creating HPUEs with two transmitters or using two different transmission antennas to send two different data streams or layers over the same component carrier using MIMO. Thus, embodiments provided herein can utilize each transmitter in a specific way to achieve optimal uplink performance.

Further, the uplink layer management system 200 selectively assigns uplink transmission layers for uplink transmissions from the wireless devices to access nodes based on a zone in which the wireless device is located. Exemplary embodiments described herein include instructing wireless devices to add transmission layers or to add or discontinue use of certain frequencies or CCs based on zone. For example, while higher frequencies can be used for uplink transmissions from wireless devices closer to an access node, as the distance increases, the wireless devices can be instructed to instead utilize lower frequencies for uplink transmissions. Multiple additional transmission layers using the lower frequencies can be assigned to improve uplink throughput and maximize uplink coverage and capacity.

Wireless devices 160 may be any device, system, combination of devices, or other such communication platform capable of communicating wirelessly with RAN 120 using one or more frequency bands deployed therefrom. Each of the wireless devices 160 may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can exchange audio or data via RAN 120.

Wireless device 140 may be or include, for example, CPE or home internet (HINT) devices. The wireless devices 140 may include multiple Tx antennas 142, 144, 146 for communicating with access nodes 130 in the uplink. Further, the wireless devices 140 may offer Wi-Fi or other types of communication links 150 in order to facilitate communication with the wireless devices 160. Accordingly, the wireless devices 140 may be or include, for example, fixed wireless access (FWA) devices, which are generally connected to a power source, thereby minimizing battery life concerns that occur when wireless devices transmit on the uplink side at maximum power for long periods of time.

Other network elements may be present to facilitate communication but are omitted for clarity, such as base stations, base station controllers, mobile switching centers, dispatch application processors, and location registers such as a home location register or visitor location register. Components not specifically shown in FIG. 1 can further include processing nodes, controller nodes, routers, gateways, and physical and/or wireless data links for communicating signals among various network elements, additional base stations, controller nodes, telephony switches, internet routers, network gateways, computer systems, communication links, or other type of communication equipment, and combinations thereof.

Figure 2:
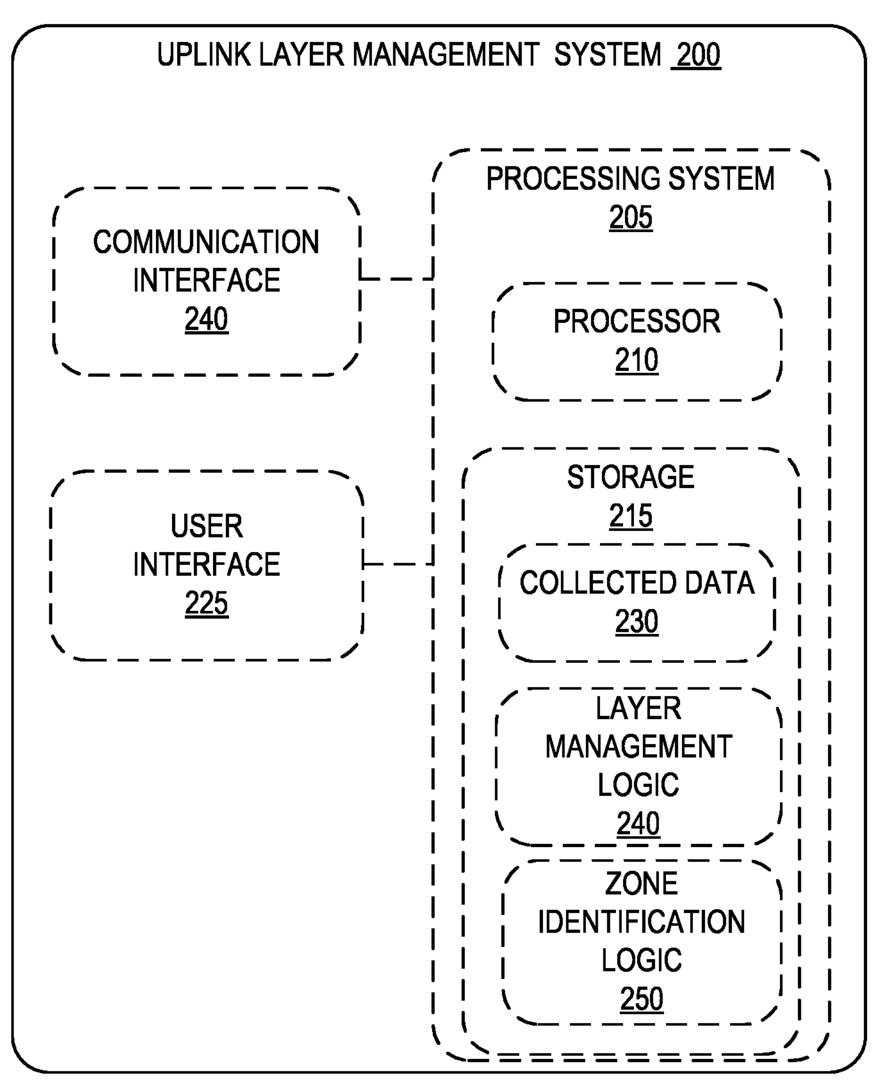
FIG. 2 depicts an exemplary uplink layer management system in accordance with disclosed embodiments.

FIG. 2 illustrates an uplink layer management system 200 in accordance with embodiments described herein. The components described herein are merely exemplary as many different configurations for the uplink layer management system 200 may be implemented. The uplink layer management system 200 may be configured to perform the methods and operations disclosed herein to optimize uplink transmission for a multi-antenna wireless device 140. In the disclosed embodiments, the uplink layer management system 200 may be integrated with each access node 130, integrated with the core network 110 or may be an entirely separate component capable of communicating with at least the wireless devices 140 and the RAN 120. Further, the components of the uplink layer management system 200 may be distributed so that one or more components is located at an access node 130 and one or more other components are located within a separate processing node or at the core network 110.

The uplink layer management system 200 may be configured for collecting data transmitted by the wireless devices 140, 160 to the access nodes 130. To perform uplink layer management, the uplink layer management system 200 may utilize a processing system 205. Processing system 205 may include a processor 210 and a storage device 215. Storage device 215 may include a RAM, ROM, disk drive, a flash drive, a memory, or other storage device configured to store data and/or computer readable instructions or codes (e.g., software). The computer executable instructions or codes may be accessed and executed by processor 210 to perform various methods disclosed herein. Software stored in storage device 215 may include computer programs, firmware, or other form of machine-readable instructions, including an operating system, utilities, drivers, network interfaces, applications, or other type of software. For example, software stored in storage device 215 may include a module for performing various operations described herein. For example, layer management logic 240 may store instructions to manage uplink layers and zone identification logic 250 may utilize stored instructions to define multiple zones and identify a zone of the wireless device 140 based on collected data 230. The layer management logic 240 may operate on wireless devices 140 based on the zone identified by zone identification logic 250. Further, the memory 215 may store collected data at 230, which may be or include data collected from the wireless devices 140. To perform the above-described operations, the layer management logic 240 and zone identification logic 250 may be executed by the processor 210 to operate on the collected data 230.

Processor 210 may be a microprocessor and may include hardware circuitry and/or embedded codes configured to retrieve and execute software stored in storage device 215. The uplink layer management system 200 further includes a communication interface 220 and a user interface 225. Communication interface 220 may be configured to enable the processing system 205 to communicate with other components, nodes, or devices in the wireless network. For example, the uplink layer management system 200 receives relevant parameters from an access node 130 or from the wireless devices 140, 160.

Communication interface 220 may include hardware components, such as network communication ports, devices, routers, wires, antenna, transceivers, etc. User interface 225 may be configured to allow a user to provide input to the uplink layer management system 200 and receive data or information from access nodes 130 or the wireless devices 140, 160. User interface 225 may include hardware components, such as touch screens, buttons, displays, speakers, etc. The uplink layer management system 200 may further include other components such as a power management unit, a control interface unit, etc.

The location of the uplink layer management system 200 may depend upon the network architecture. As set forth above, the uplink layer management system 200 may be located in the core network 110, in a separate processing node, in the RAN 120, in multiple locations, or may be an entirely discrete component. Further, although shown as a single integrated system, the functions of data collection, zone definition, zone determination, and uplink layer management may be separated and disposed in separate locations.

Figure 3:
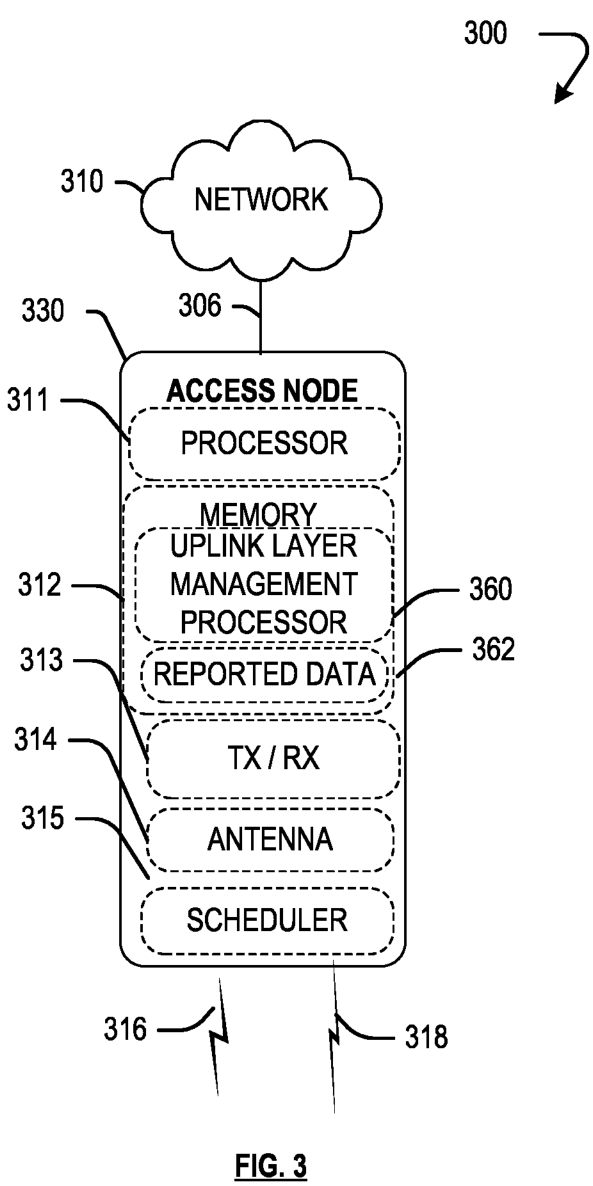
FIG. 3 depicts an exemplary access node in accordance with disclosed embodiments.

FIG. 3 illustrates an operating environment 300 for an exemplary access node 330 in accordance with the disclosed embodiments. In exemplary embodiments, access node 330 can include, for example, a gNodeB or an eNodeB. Access node 330 may comprise, for example, a macro-cell access node, such as access nodes 130 described with reference to FIG. 1. Access node 330 is illustrated as comprising a processor 311, memory 312, transceiver(s) 313, and antenna (s) 314, and scheduler 315. Processor 311 executes instructions stored on memory 312, while transceiver(s) 313 and antenna(s) 314 enable wireless communication with other network nodes, such as wireless devices described herein, and other nodes. For example, wireless devices 140, 160 may initiate uplink transmissions such that the transceivers 313 and antennas 314 receive messages from the wireless devices, for example, over communication links 316 and 318 and pass the messages to a mobility entity in the core network. Further, the transceivers 313 and antennas 314 receive signals from the mobility entity such as a mobility management entity (MME) or access and mobility function (AMF) and pass the messages to the appropriate wireless device 140, 160. Scheduler 315 may be provided for scheduling resources based on the presence and performance parameters of the wireless devices. The access node 330 may connect over a communication link 306 to a network 310. Network 310 may be similar to core network 110 discussed above.

In embodiments provided herein, the memory 312 may further store reported data at 362. The reported data 362 may be data collected from the wireless devices 140, such as performance parameters including SINR or RSRP or location data. Thus, the processor 210 from the uplink layer management system 200 may communicate with the access node 330 in order to receive relevant data from the reported data 362. For example, both performance parameters and/or location data can be utilized by the processor 210 of the uplink layer management system 200 in order to identify a zone associated with a wireless device 140, 160. Further, in some embodiments, the access node 330 may include an uplink layer management processor 360 that reports the relevant data to the uplink layer management system 200 in a manner requested by the uplink layer management system 200. In other embodiments, the uplink layer management system 200 may be wholly incorporated in the access node 330.

Figure 4:
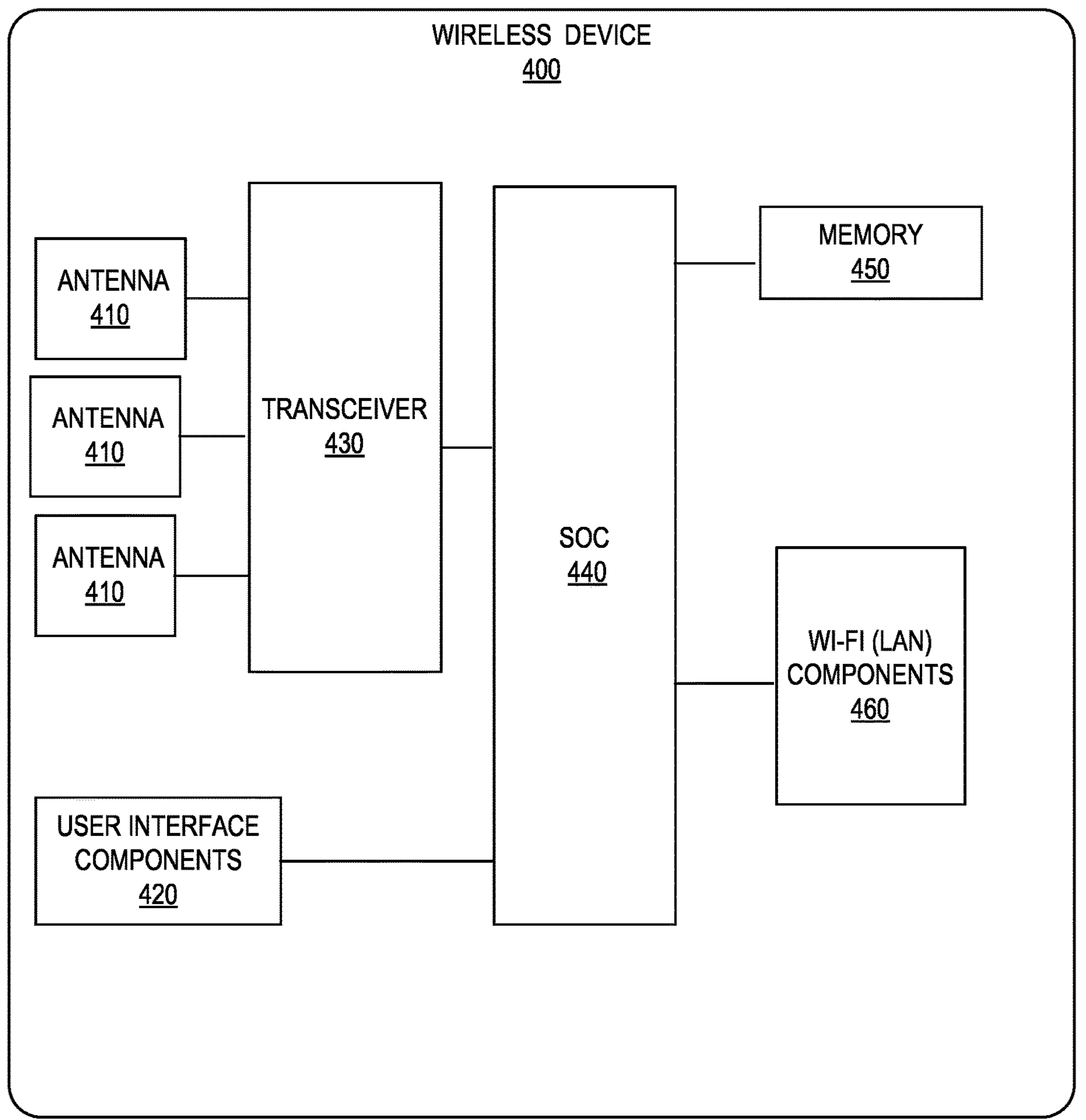
FIG. 4 depicts an exemplary wireless device in accordance with disclosed embodiments.

FIG. 4 depicts a wireless device 400 in accordance with disclosed embodiments. The wireless device 400 may correspond to the wireless device 140 shown in FIG. 1. The components described herein are merely exemplary as many different configurations for the wireless device 400 may be implemented. The wireless device 400 may include, for example, multiple antennas for communicating with a cellular network such as antennas 410. The antennas 410 may include, for example, three Tx antennas for communicating with the access nodes 130. The antennas 410 may further include any number of receiving antennas. Different antennas may connect with different component carriers and different frequency bands. The wireless gateway device 400 may further include a transceiver 430, a system on chip (SoC) 440, a memory 450, and Wi-Fi or LAN components 460. The user interface components 420 may operate to allow set-up of the wireless device 400. Other components may also be included.

The SoC 440 is an integrated circuit that integrates most or all components of a computer or other electronic system. The SoC 440 includes a central processing unit (CPU), memory interfaces, on-chip input/output devices, input/output interfaces, and secondary storage interfaces. Other components, such as a radio modem and radio frequency signal processing may also be included. The SoC 440 integrates a microcontroller, microprocessor or several processor cores with peripherals like a GPU, Wi-Fi and cellular network radio modems, and/or one or more coprocessors.

The components of the SoC 440 may cause the wireless device 400 to function as a both a router and a modem in order to ensure wireless devices access to the Internet through a WLAN. The Wi-Fi or LAN components 460 may include additional antennas, transceivers, and other components to provide the WLAN. In additional embodiments ethernet technologies are incorporated in the wireless device 400 to add to its functionality.

The memory 450 may store, for example, reporting instructions executed by a processor of the SoC 440 to cause the wireless device 400 to send reports to the access node 330 or directly to the uplink layer management system 200. The reports may include, for example, a location of the wireless device 400, PHR, SINR, RSRP, RSRQ and/or other parameters indicative of signal strength, quality, or location.

Figure 5:
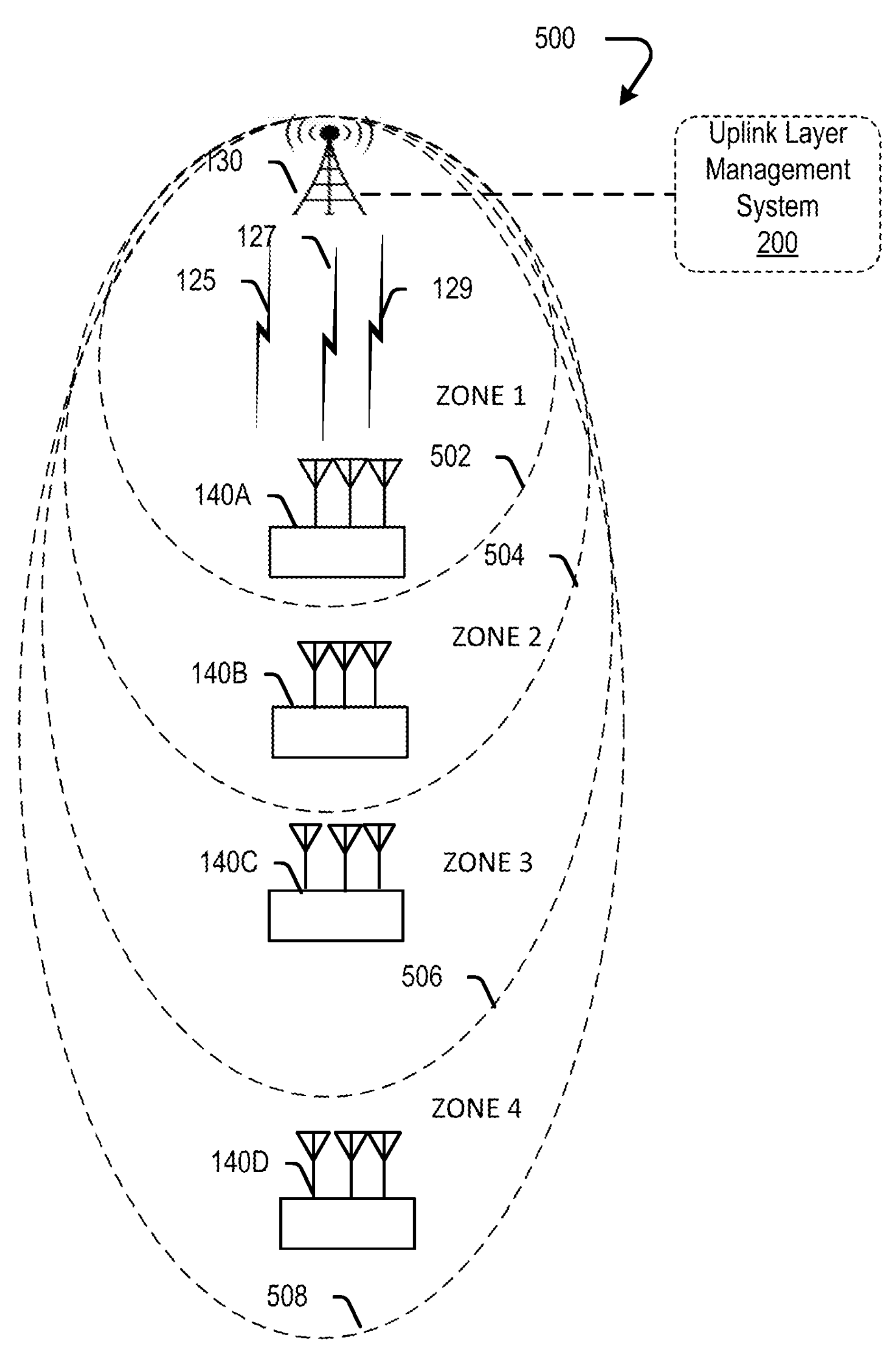
FIG. 5 illustrates a further environment for operations of an uplink layer management system in accordance with a disclosed embodiment.

FIG. 5 is a diagram further illustrating an environment 500 for uplink layer management in accordance with embodiments described herein. An access node 130 communicates with wireless devices 140*a* . . . 140*d* over wireless air interfaces 125, 127, 129. As set forth above, the wireless air interfaces 125, 127, 129 may provide TDD and FDD in the uplink to enable the wireless devices 140*a* . . . *d* to reach the access node 130. In order to deploy the air interfaces 125, 127, 129, the access node 130 may have multiple radios or may comprise multiple co-located access nodes, which may, for example, be gNBs. Each of the wireless devices 140*a* . . . 140*d* may reside within zone 1, zone 2, zone 3, or zone 4.

Zone 1 may be defined as an area within a first set radius from the access node 130. Alternatively, zone 1 may be defined based on signal strength, wherein all locations experiencing a threshold signal strength reside in zone 1. Zone 1 may also be described as a near zone, in which all component carriers are able to communicate in the uplink with the access node 130.

Zone 2 is defined as being between boundaries 502 and 504 and may be described as a mid-cell zone. The boundaries 502, 504 may represent a set distance or alternatively may represent signal strengths such that locations within a particular range of signal strengths fall into zone 2. In particular embodiments, zone 2 is defined based on an uplink SINR threshold. Specifically, when the uplink SINR becomes sufficiently weak such that MIMO is not possible, a boundary can be defined between zone 1 and zone 2.

Zone 3 is defined as being between boundaries 504 and 506, which may represent set distances or signal strengths as set forth above. In embodiments described herein, zone 3 may represent a coverage extension area for TDD component carriers, which has a smaller coverage area than FDD component carriers. Finally, zone 4 is defined as being between boundaries 506 and 508, where boundary 508 may be a cell edge boundary. As set forth above, the boundaries may represent distances or signal strengths. Specifically, zone 3 may be defined based on a location where a standard UE can no longer transmit to the access node using the TDD carrier components 602, 604 in the uplink. Instead, when a wireless device 140 crosses the boundary 504 between zone 2 and zone 3, transmit diversity or double power is required to communicate in the uplink using the TDD component carriers 602, 604.

Zone 4 may represent an FDD cell edge area, where no uplink coverage is available through the TDD component carriers, but coverage is still available in the uplink over the FDD component carrier. The exact location of the above-described boundaries may be defined based on network characteristics and the locations of the boundaries may be stored, for example, in the memory 215 of the uplink layer management system 200.

In embodiments set forth herein, the communication links 125, 127, and 129 may be representative of different frequencies and different communication modes. For example, the communication link 125 may represent a TDD communication link with a bandwidth of 100 MHz. The communication link 127 may also be a TDD communication link with a bandwidth of 80 MHz. Finally, the communication link 129 may be an FDD communication link with a bandwidth of 20 MHz. The communication links 125, 127, and 129 may provide coverage in both the uplink and downlink directions depending on the location of the wireless device 140*a* . . . *d*. However, with respect to the uplink layer management system 200, the communication links 125, 127, and 129 are primarily described with reference to the uplink direction.

It should be noted that while the access node 130 is shown as a single access node, it may include multiple radios or multiple co-located or adjacent access nodes in order to deploy the multiple communication links 125, 127, and 129 described above. The access node 130 may be or include the features described above with respect to FIGS. 1 and 4. Further the access node 130 may wholly incorporate the uplink layer management system 200.

The access node 130 communicates with the wireless devices 140*a* . . . 140*d*, each of which is in a different zone. Based on the zone for each wireless device 140*a* . . . 140*d*, the access node 130, using the uplink layer management communication system 200 selects an uplink communication mode for each of the wireless devices 140*a* . . . 140*d*. The access node 130 or uplink layer management communications system 200 sends an instruction to each wireless device 140*a* . . . 140*d* for initiating uplink communications in accordance with the selected mode.

Figure 6:
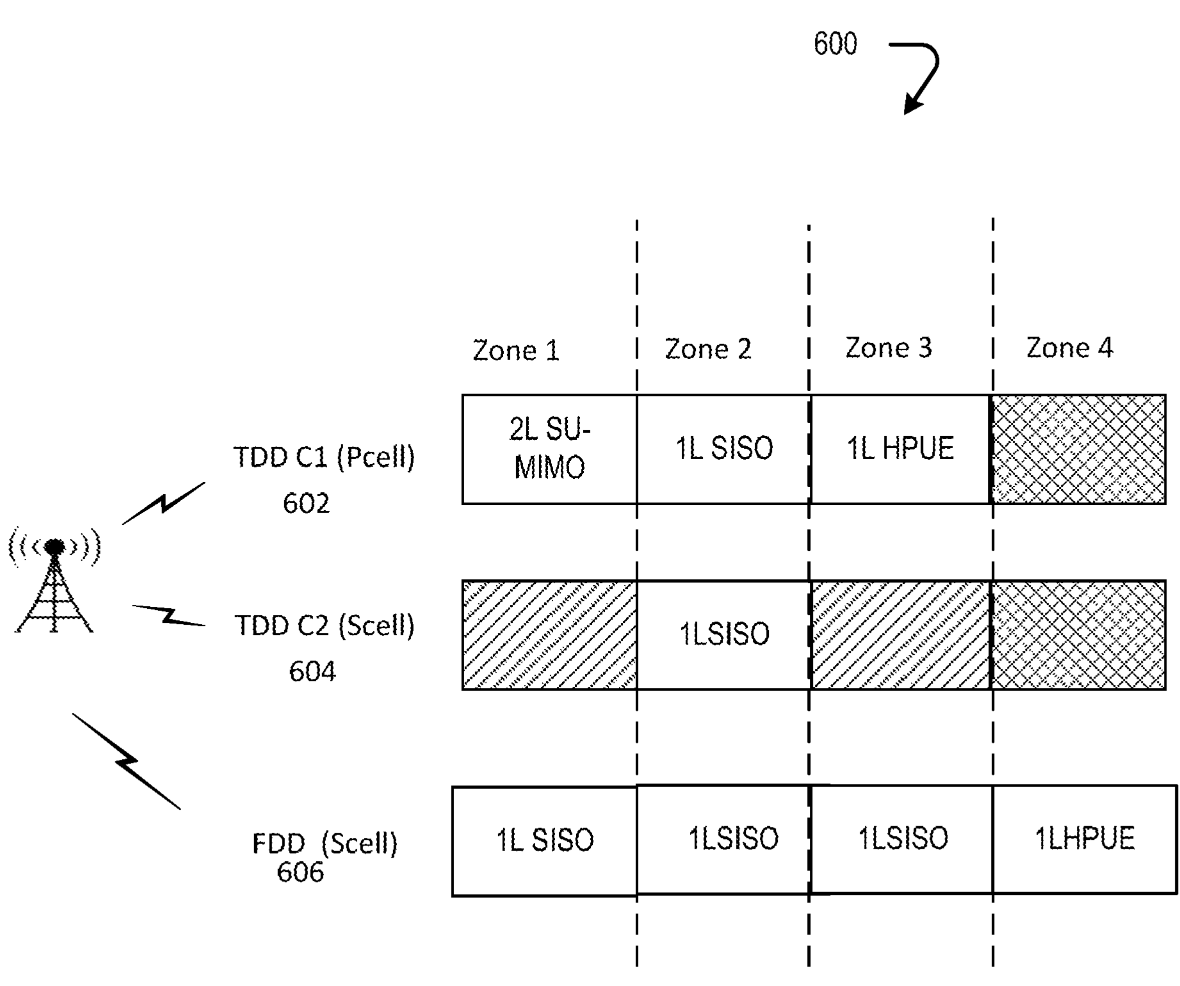
FIG. 6 is a diagram illustrating operation of the uplink layer management system in accordance with a disclosed embodiment.

FIG. 6 is a table 600 illustrating exemplary uplink communication modes for the wireless devices 140*a* . . . 140*d* in the environment described above with respect to FIG. 5. In the illustrated embodiment, two TDD component carriers are available, where a first TDD component carrier 602 has a bandwidth of 100 MHz and a second TDD component carrier 604 has a bandwidth of 80 MHz. Further, an FDD component carrier 606 has a bandwidth of 20 MHz. Typically, the first component carrier 602 functions as a primary cell (PCell), while the other component carriers 604 and 606 function as secondary cells (SCells). In embodiments described herein, carrier aggregation may be supported for all of the above-described component carriers. Further, it should be understood that the precise spectrum bands implemented may vary depending on market or region.

Further, as set forth above, each of the wireless devices 140*a* . . . *d* has three uplink transmission antennas. The uplink layer management system 200 provides instructions to the wireless device 140*a* . . . 140*d* regarding uplink transmission modes for each of the transmission antennas. In embodiments provided herein, the wireless devices 140*a* . . . 140*d* are CPEs adapted to operate in a 5G environment. The wireless devices 140*a* . . . 140*d* are capable of two CC and three CC carrier aggregation.

The wireless device 140*a* is shown as located in zone 1, which is the zone nearest to the access node 130. To maximize uplink performance in zone 1, the uplink layer management system 200 may instruct the wireless device 140 to have two antennas transmit over the first component carrier 602 (TDD C1), which functions as a PCell and further has the largest bandwidth of the described component carriers at 100 MHz. In the uplink, the TDD carriers typically only transmit twenty or thirty percent of the time, with the remaining time reserved for downlink transmission. Thus, a 100 MHz bandwidth for TDD is approximately equal to a 20 MHz bandwidth for FDD, which allows uplink transmissions 100% of the time.

Because of proximity to the access node, the device 140*a* is capable of using MIMO. Using two layer MIMO on the TDD carrier 602 doubles throughput. Accordingly, the device 140*a* utilizes two layer SU-MIMO over TDD C1. To further optimize uplink transmissions for the wireless device 140*a*, the uplink layer management system 200 instructs the wireless device 140*a* to perform uplink transmissions with the third antenna on the FDD carrier 606. In the described embodiment, the FDD carrier 606 has a bandwidth of 20 MHz. However, because the carrier 606 is an FDD carrier, which transmits in the uplink all of the time, as opposed to the intermittent transmittal in the uplink of the TDD carriers, this solution for the wireless device 140*a* in zone 1 leads to reliable and efficient uplink transmission transmitting a total of 300 megabits per second (mpbs) (i.e., 200 mbps over TDD and approximately 100 mpbs over FDD) over the available bandwidth. Thus, in the near zone, the wireless device 140*a* utilizes two CC uplink carrier aggregation with two layer SU-MIMO on TDD and one layer SISO on FDD.

The wireless device 140*b* is shown as located in zone 2, which is a mid-cell zone. In this location, the uplink layer management system 200 instructs the wireless device 140*b* to utilize TDD cell 602 with one antenna (one layer TDD). The wireless device 140*b* is instructed to transmit using the second antenna over TDD carrier 604, and to transmit using the third antenna over FDD carrier 606. Accordingly, the wireless device 140*b* is instructed to perform three CC carrier aggregation, with one layer utilized for each TDD 602, 604 and one layer utilized for the FDD carrier 606. It should be noted that the device 140*b* is not close enough to the access node 130 to allow for uplink MIMO as the uplink SINR is insufficient in zone 2 to use MIMO. The total throughput in this situation is approximately 280 mbps (100 mbps on TDD1, 80 mbps on TDD2, and approximately 100 mbps on FDD).

The wireless device 140*c* is shown as located in zone 3, which is a TDD cell edge zone. Accordingly, in this TDD cell edge zone, wireless devices often have insufficient transmit power to communicate with the access node 130 over the TDD carriers 602, 604. In order to overcome this obstacle, the uplink layer management system 200 instructs the wireless device 140*c* to use transmit diversity in order to combine the power of two antennas to transmit over the TDD carrier 602. With the combined transmit power of two antennas, causing the wireless device 140*c* to function as an HPUE, the wireless device 140*c* is able to communicate in the uplink with the access node over the TDD carrier 602. Without transmit diversity, the wireless device 140*c* does not have adequate transmit power to communicate in the uplink with the access node 130 using the TDD component carrier. Further, the uplink layer management system 200 instructs the wireless device 140*c* to utilize the third antenna with the FDD carrier 606, thus causing the wireless device 140*c* to utilizes one layer SISO with the third antenna. Accordingly, the wireless device 140*c* is optimized to use two CC carrier aggregation with one layer transmit diversity on the first component carrier 602 and one layer SISO on the third component carrier 606. In this situation, the uplink throughput is approximately 200 mpbs, with 100 mbps on TDD component carrier 702 and approximately 100 mbps on the FDD component carrier.

Finally, the fourth wireless device 104*d* is shown as being located in zone 4, which is an FDD cell edge zone. In zone 4, the wireless devices are unable to communicate using TDD as TDD provides downlink coverage only on this zone. Accordingly, the uplink layer management system 200 utilizes transmit diversity to combine the antennas for use over FDD in order to provide sufficient power for the wireless device 140*d* to reach the access node 130. Accordingly, as the wireless device 140*d* cannot connect in the uplink to the access node 130 over the TDD carriers 602, 604, the wireless device 140*d* is subject to an inter-frequency handover from the TDD carrier 602 as the PCell to the FDD carrier 606 as the PCell. Thus, in zone 4, the wireless device 104*d* does not perform uplink carrier aggregation as the wireless devices in zones 1-3 do. Instead, the wireless device 104*d* transmits in the uplink on one layer with transmit diversity using the FDD component carrier 606. Thus, while the power is tripled, the throughput in this scenario remains approximately 100 mbps for the FDD component carrier 606.

Thus, each of the four zones is correlated with a corresponding uplink transmission mode for the multi-antenna wireless device. Further, the uplink layer management system 200 may store a table similar to that shown in FIG. 6, including the correlated zones and antenna transmission modes.

Figure 7A:
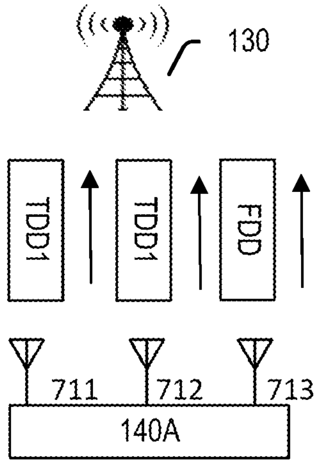
FIGS. 7A-7D are block diagrams illustrating uplink layer management in four zones in accordance with a disclosed embodiment.

FIGS. 7A-7D further illustrate the functionality of the wireless devices 140*a* . . . 140*d* in accordance with embodiments described herein. FIG. 7A illustrates the wireless device 140*a*, which is disposed in zone 1 and has three antennas 711, 712, and 713. As described above, the uplink layer management system 200 instructs antennas 711 and 712 to transmit in the uplink over the first TDD component carrier, causing the wireless device to perform two layer transmission over the first TDD component carrier using SU-MIMO. The uplink layer management system 200 further instructs the third antenna 713 to perform uplink transmission over the FDD component carrier. Accordingly, the wireless device 140*a* performs two CC carrier aggregation over the first TDD CC and the FDD CC.

Figure 7B:
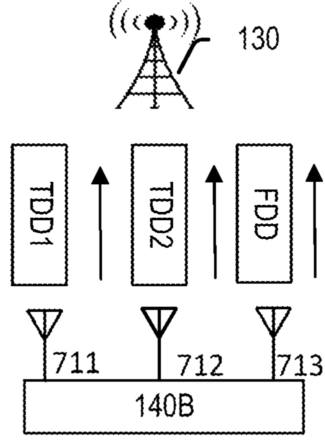

FIG. 7B illustrates the functionality for the wireless device 140*b*, which is located in zone 2, or the mid-cell. The uplink layer management system 200 instructs the wireless device 140*b* to utilize all three component carriers described above in order to optimize uplink transmission efficiency. Accordingly, the antenna 711 utilizes the first TDD component carrier, the antenna 712 utilizes the second TDD component carrier, and the antenna 713 utilizes the FDD component carrier. Thus, in the mid-cell zone, the wireless device 140 utilizes three CC carrier aggregation to optimize uplink performance. Note that the two layer MIMO configuration used in zone 1 cannot be used for zone 2, which is further from the access node 130. Using the configuration described for zone 2, uplink data transmission can occur at 280 mbps, which is an optimization for zone 2.

Figure 7C:
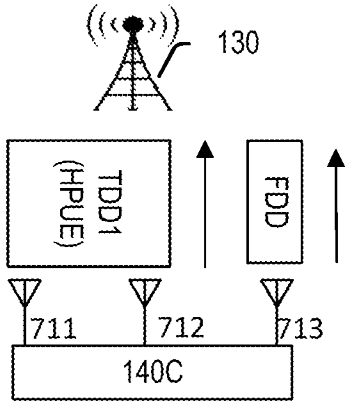

FIG. 7C illustrates the functionality of the wireless device 140*c* which is located in zone 3 or the TDD cell edge zone. Because the power of one antenna does not produce reliable uplink transmission over TDD in zone 3, the uplink layer management system 200 instructs the wireless device 140*c* to use transmit diversity to combine the power of two antennas over the first TDD carrier, which has more bandwidth that the second TDD component carrier. Additionally, because the FDD component carrier still offers reliable uplink transmission in zone 3, the uplink layer management system 200 instructs the wireless device 140*c* to utilize the third antenna 713 to transmit in the uplink using the FDD component carrier. Accordingly, in zone 3, the wireless device 140*c* performs two CC carrier aggregation with the first TDD component carrier and the FDD component carrier, using transmit diversity on the first TDD component carrier. Using this operation, the uplink data transmission can achieve 180 mpbs in the currently described environment, which is an optimization for zone 3.

Figure 7D:
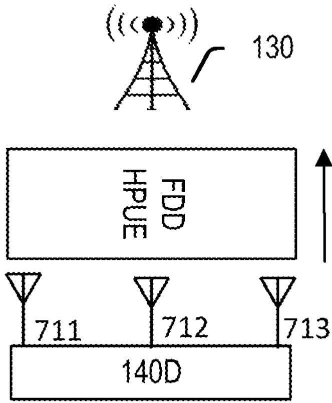

FIG. 7D illustrates the functionality of the wireless device 140*d* located in zone 4, which is the FDD cell edge zone. In zone 4, the wireless device 140*d* does not have sufficient power to communicate in the uplink with the access node 130 over the TDD component carriers at all. Accordingly, the uplink layer management system 200 instructs the wireless device 140*d* to communicate in the uplink with all three antennas 711, 712, 713 using the FDD component carrier. Thus, the wireless device 140*d* in zone 4 uses transmit diversity to combine the power of all three antennas to communicate with the access node 130 using the FDD component carrier. In order to execute this instruction, the wireless device 140*d* may be subject to an inter-frequency handover from the TDD component carrier as the PCell to the FDD component carrier as the PCell. This operation effectively extends the range of the wireless device 140*d* at the FDD cell edge as the wireless device 140*d* is on one layer transmit diversity with no carrier aggregation in zone 4. Using this operation, the uplink data transmission can achieve 80 mpbs in the currently described environment, which is an optimization for zone 4. More importantly, the transmit diversity enables the wireless device 140D to reach the access node in the uplink, which would not be possible without the combination of the power of multiple transmit antennas.

The optimization described above maximizes spectrum assets available from the different FDD and TDD bands. The optimization helps to reduce the need to deploy new cell sites and improves the user experience by providing a consistent level of service.

Figure 8:
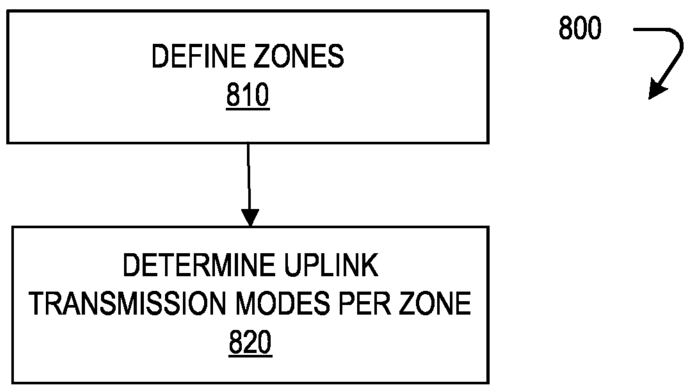
FIG. 8 is a flow chart illustrating a layer management method in accordance with an additional disclosed embodiment.
Figure 9:
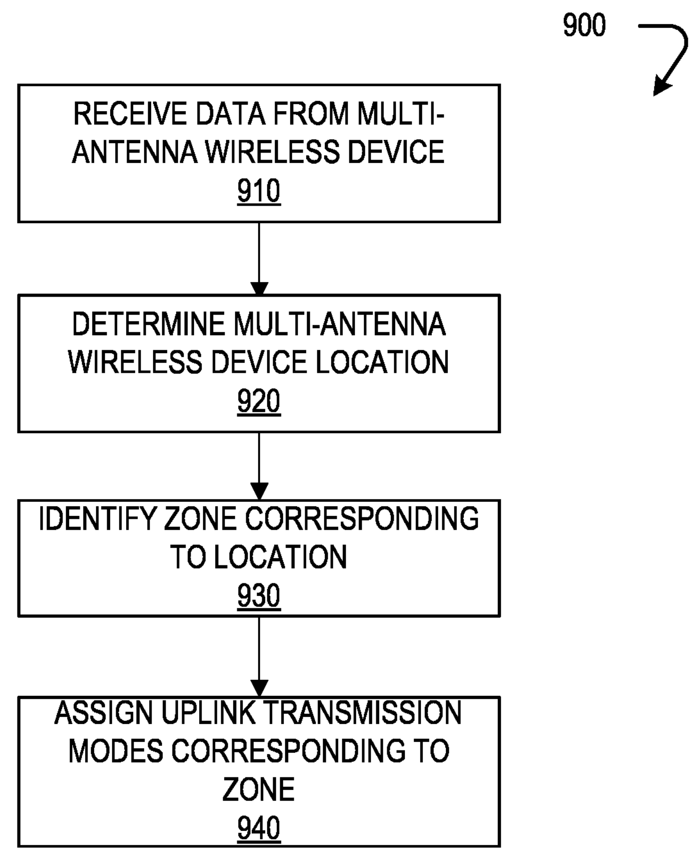
FIG. 9 is a flowchart illustrating a layer management method performed by a wireless device in accordance with embodiments disclosed herein.

The disclosed methods for uplink transmission layer management are further described below with reference to FIGS. 8-10. FIG. 8 illustrates an exemplary method 800 performed by an uplink transmission layer management system 200. Method 800 may be performed by any suitable processor discussed herein, for example, the processor 210 included in the uplink transmission layer management system 200 or any other suitable processor. For the sake of convenience, the method is described as being performed by the processor 210.

Method 800 starts in step 810, when the processor 210 defines zones to correspond to those described above. The zones may be based on distances from the access node 130 or based on signal strengths reported to the access node 130. In embodiments provided herein, four zones are defined, which include a near zone having the strongest signals, a mid-cell zone adjacent to the near zone, a TDD coverage extension zone, and an FDD cell edge zone. The zones may be defined based on network parameters and the component carriers of the network.

The method continues to step 820, in which the processor 210 determines uplink transmission modes corresponding to each zone. In embodiments provided herein, the uplink transmission modes are selected to correspond to those performed by a wireless device 140 having three uplink transmission antennas used in a 5G environment. However, other number of antennas and environments may also be utilized. The uplink transmission modes are selected based on uplink coverage information for each zone, wireless device characteristics, and component carrier bandwidth. To assess uplink coverage information, the processor 210 may calculate an average distance at which all of the wireless devices in a cell run out of transmit power on the uplink for each component carrier. This distance is the estimated "uplink coverage" distance or the distance for reliable wireless device transmission in the cell. In embodiments provided herein, the modes are selected to maximize uplink throughput and efficiency for the wireless device 140 and may involve two CC or three CC carrier aggregation using one or more layers on each component carrier. The modes may further involve transmit diversity to combine the power of the transmission antennas in zones further from the access node 130. In embodiments provided herein, the uplink transmission modes are defined to correspond to those described above with respect to FIG. 6 and FIGS. 7A-7D. The processor 210 may create a table to be used for selection of uplink transmission modes the wireless devices. The table may correspond, for example, to the table shown in FIG. 6.

Once the zones and transmission modes are defined as described above with respect to FIG. 8, method 900 starts in step 910, when the processor 210 collects data from wireless devices 140. In embodiments set forth herein, the processor 210 of the uplink layer management system 200 may collect this data directly from the wireless devices 140 or alternatively from the access nodes 130, depending on the location of the uplink layer management system 200. The data may for example, include for example, RSRP, SINR, or location or GPS data.

In step 920, the processor 210 determines a multi-antenna wireless device location based on the collected data. For example, the processor 210 can estimate a wireless device location based on signal strengths at different geographical points. Alternatively, the processor 210 may receive and utilize GPS data to ascertain the location of the wireless device. This step may be optional when the zones are defined by signal strengths rather than by location.

In step 930, the processor 210 identifies a zone for the wireless device based on the location ascertained from collected data. For example, the processor 210 can match the locations of the wireless devices 140 with the defined boundaries for zones 1-4. Alternatively, the processor 210 can utilize signal strengths reported by the wireless devices to classify the wireless device into one of the four zones when the zones are defined by signal strength thresholds.

Finally, in step 940, the processor 210 selects uplink transmission modes for each of the transmission antennas of the wireless device 140 based on the determined zone. The uplink transmission modes are defined as set forth above with respect to FIG. 8. The uplink transmission mode may be selected by the processor 210 through consultation with a table created listing a number of uplink transmission antennas and the corresponding selected modes for each antenna that are designed to maximize uplink efficiency.

Figure 10:
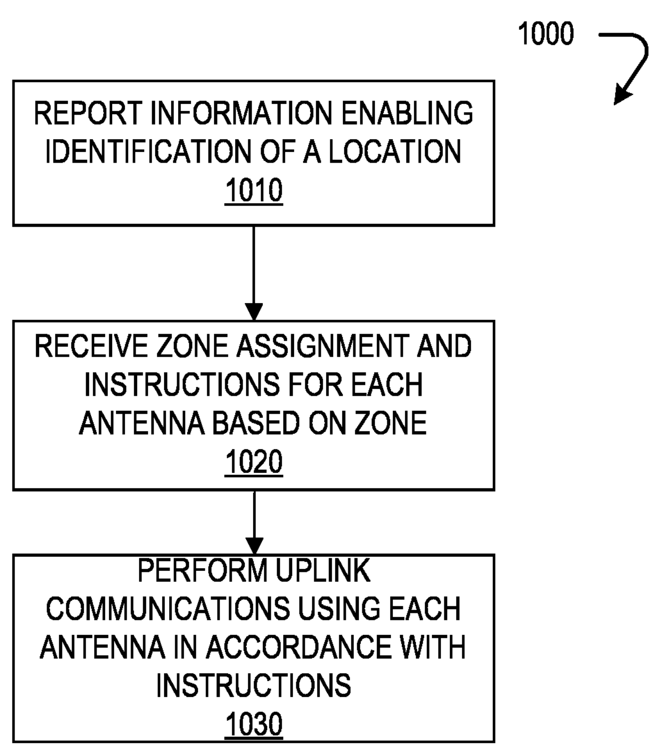
FIG. 10 is a flowchart illustrating a method performed by a wireless device in accordance with embodiments disclosed herein.

FIG. 10 illustrates a further method 1000 for uplink layer management in accordance with embodiments set forth herein. In particular, the method 1000 illustrates a method performed by a wireless device. Method 1000 may be performed by a processor, for example, the processor in the SoC 440 of the wireless device 400.

Method 1000 starts in step 1010, when the wireless device 140 reports information to the access node 130. The information may include, for example, GPS location information or signal strength parameters such as, for example, RSRP and/or SINR.

In step 1020, the wireless device 140 receives an uplink transmission mode assignment based on the information reported to the access node 130. As set forth above, the uplink transmission mode assignment may be determined by the uplink layer management system 200, which creates the assignments based on network parameters and wireless device characteristics.

Finally, in step 1030, the wireless device 140 performs uplink communications in accordance with its received instructions. In embodiments provided herein, the instructions provide an uplink transmission mode for each uplink transmission antenna of the wireless device 140.

Accordingly, methods provided herein provide improved uplink transmission efficiency for wireless devices in order to enhance overall network performance. In some embodiments, methods 800, 900, and 1000 may include additional steps or operations.

Furthermore, the methods may include steps shown in each of the other methods. As one of ordinary skill in the art would understand, the methods 800, 900, and 1000 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

The methods, systems, devices, networks, access nodes, and equipment described herein may be implemented with, contain, or be executed by one or more computer systems and/or processing nodes. The methods described above may also be stored on a non-transitory computer readable medium. Many of the elements of the operating environment 100 may be, comprise, or include computers systems and/or processing nodes, including access nodes, controller nodes, and gateway nodes described herein.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for optimizing uplink transmissions for a multi-antenna wireless device having multiple antennas, the method comprising:

determining a location of the multi-antenna wireless device;

identifying a zone of multiple zones for the multi-antenna wireless device based on the location of the multi-antenna wireless device, each of the multiple zones defined based on a distance from a serving access node;

determining an uplink transmission mode corresponding to each zone of the multiple zones, wherein a zone closest to the serving access node requires carrier aggregation for the multiple antennas to maximize uplink throughput and a zone furthest from the access node requires transmit diversity on the multiple antennas to create high powered user equipment (HPUE) enabling uplink signals to reach the serving access node; and selecting an uplink transmission mode for each of the multiple antennas of the multi-antenna wireless device based on the identified zone.

2. The method of claim 1, further comprising selecting the uplink transmission mode to optimize uplink throughput for the muti-antenna wireless device.

3. The method of claim 1, further comprising defining the multiple zones within a cell and defining an uplink transmission mode for each antenna based on the zone of the multi-antenna wireless device.

4. The method of claim 3, further comprising sending an instruction to the multi-antenna wireless device to execute uplink transmissions based on one of four zones correlated with the multi-antenna wireless device location.

5. The method of claim 3, further comprising identifying the zone for the multi-antenna wireless device based on a signal strength reported by the multi-antenna wireless device.

6. The method of claim 3, further comprising identifying the zone for the multi-antenna wireless device based on a location reported by the multi-antenna wireless device.

7. The method of claim 3, further comprising defining four zones, each of the four zones correlated with a corresponding uplink transmission mode for the multi-antenna wireless device.

8. The method of claim 1, wherein the multi-antenna wireless device includes at least three transmission antennas.

9. The method of claim 8, wherein the zone closest to the serving access node is a first zone and the method further comprises providing an uplink transmission mode correlated with the first zone including two component carrier uplink carrier aggregation (CA) with two layer single user multiple in multiple out (SU-MIMO) on a first time division duplexing (TDD) component carrier and one layer single-in single-out (SISO) SISO on a frequency division duplexing (FDD) component carrier.

10. The method of claim 9, further comprising defining a second zone adjacent the first zone, the second zone having a correlated uplink transmission mode including three component carrier CA including one layer for each of two TDD component carriers and one layer on the FDD component carrier.

11. The method of claim 10, further comprising defining a third zone adjacent the second zone, the third zone having a correlated uplink transmission mode including transmit diversity to create one layer on the first TDD component carrier and one layer on the FDD component carrier.

12. The method of claim 11, wherein the zone furthest from the serving access node is a fourth zone adjacent the third zone, the fourth zone having a correlated uplink transmission mode with transmit diversity to create one layer on the FDD component carrier.

13. A system comprising:

communication circuitry enabling communication with a multi-antenna wireless device having multiple antennas; and at least one processor performing multiple operations including;

determining a location of the multi-antenna wireless device based on communications received from the multi-antenna wireless device at the communication circuitry;

identifying a zone of multiple zones for the multi-antenna wireless device based on the location, each of the multiple zones defined based on a distance from a serving access node;

determining an uplink transmission mode corresponding to each zone of the multiple zones, wherein a zone closest to the serving access node requires carrier aggregation for the multiple antennas to maximize uplink throughput and a zone furthest from the access node requires transmit diversity on the multiple antennas to create high powered user equipment (HPUE) enabling uplink signals to reach the serving access node; and selecting an uplink transmission mode for each of the multiple antennas of the multi-antenna wireless device based on the identified zone.

14. The system of claim 13, the operations further comprising selecting the uplink transmission mode to optimize uplink throughput for the muti-antenna wireless device.

15. The system of claim 13, further comprising defining multiple zones within a cell and defining an uplink transmission mode for each antenna based on the zone of the multi-antenna wireless device.

16. The system of claim 13, the operations further comprising defining four zones, each of the four zones correlated with a corresponding uplink transmission mode for the multi-antenna wireless device.

17. The system of claim 16, wherein the multi-antenna wireless device includes at least three transmission antennas.

18. A wireless device comprising:

three transmission antennas;

at least one receiving antenna; and a processor executing instructions to perform operations including;

reporting information enabling identification of a location of the wireless device;

receiving an instruction to execute uplink transmissions based on the location of the wireless device falling into one of four zones correlated with the wireless device location, each of the four zones defined based on a distance from a serving access node, and each of the four zones correlated with an uplink transmission mode, wherein a zone closest to the serving access node requires carrier aggregation for the three antennas to maximize uplink throughput and a zone furthest from the access node requires transmit diversity on the three antennas to create a high powered user equipment (HPUE) enabling uplink signals to reach the serving access node; and performing an uplink transmission mode for each of the three transmission antennas of the wireless device based on the received instruction.

19. The wireless device of claim 18, the operations further comprising performing uplink transmissions in a first zone closest to a serving access node by including two component carrier uplink carrier aggregation (CA) with two layer single user multiple in multiple out (SU-MIMO) on a first time division duplexing (TDD) component carrier and one layer single-in single-out (SISO) on a frequency division duplexing (FDD) component carrier.

20. The wireless device of claim 19, the operations further comprising performing uplink transmission in a fourth zone further from the serving access node with transmit diversity to create one layer on the FDD component carrier.

* * * * *